(No Model.) 12 Sheets—Sheet 2.
L. EHRLICH.
CASH REGISTER, INDICATOR, AND CHECK PRINTER.
No. 560,089. Patented May 12, 1896.

(No Model.) 12 Sheets—Sheet 4.

L. EHRLICH.
CASH REGISTER, INDICATOR, AND CHECK PRINTER.

No. 560,089. Patented May 12, 1896.

(No Model.) 12 Sheets—Sheet 5.
L. EHRLICH.
CASH REGISTER, INDICATOR, AND CHECK PRINTER.

No. 560,089. Patented May 12, 1896.

Witnesses
Martin H. Olsen.
J. W. Brainard.

Inventor
Leo Ehrlich
by Edward Rector
his atty.

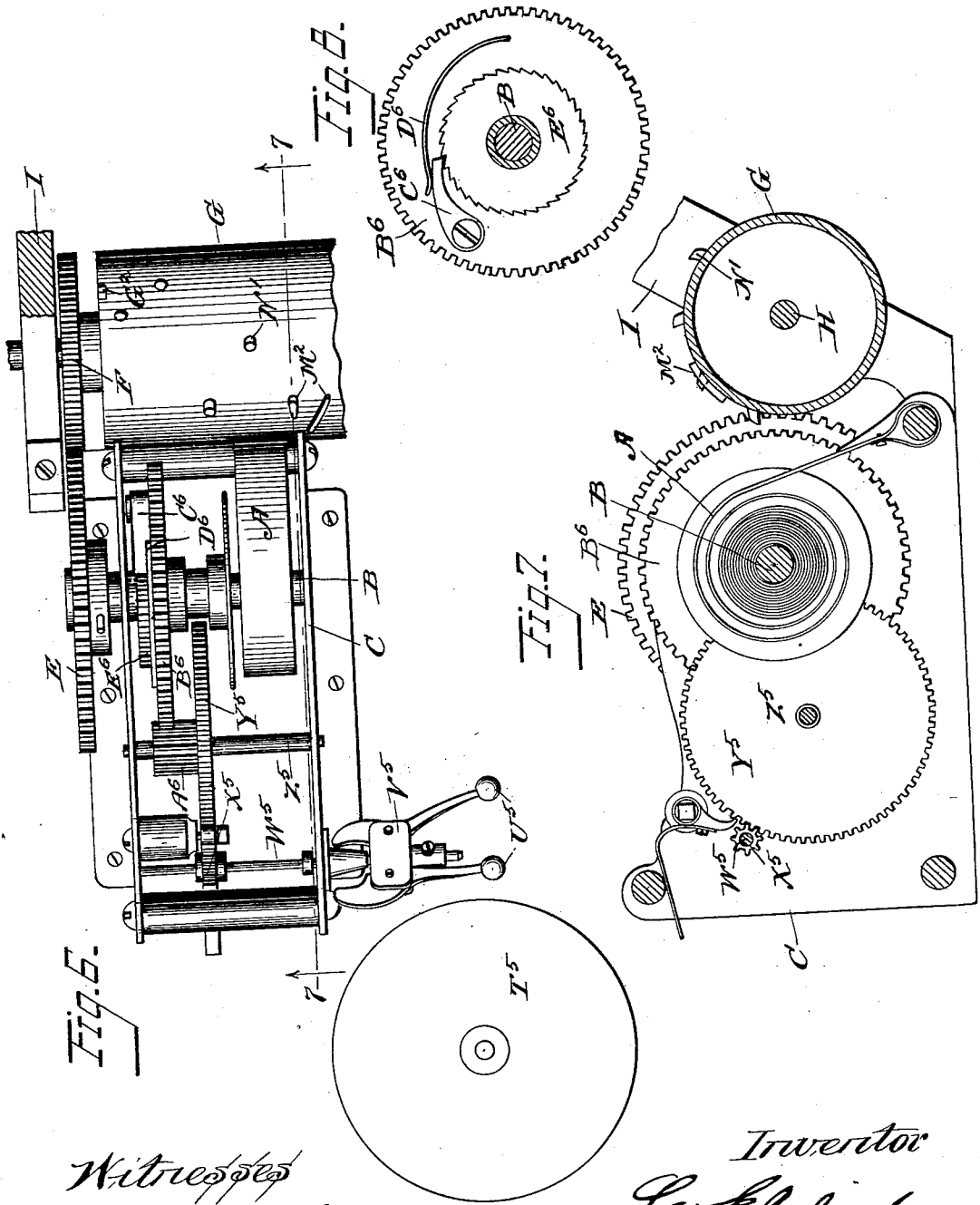

(No Model.)   L. EHRLICH.   12 Sheets—Sheet 7.
CASH REGISTER, INDICATOR, AND CHECK PRINTER.
No. 560,089.   Patented May 12, 1896.
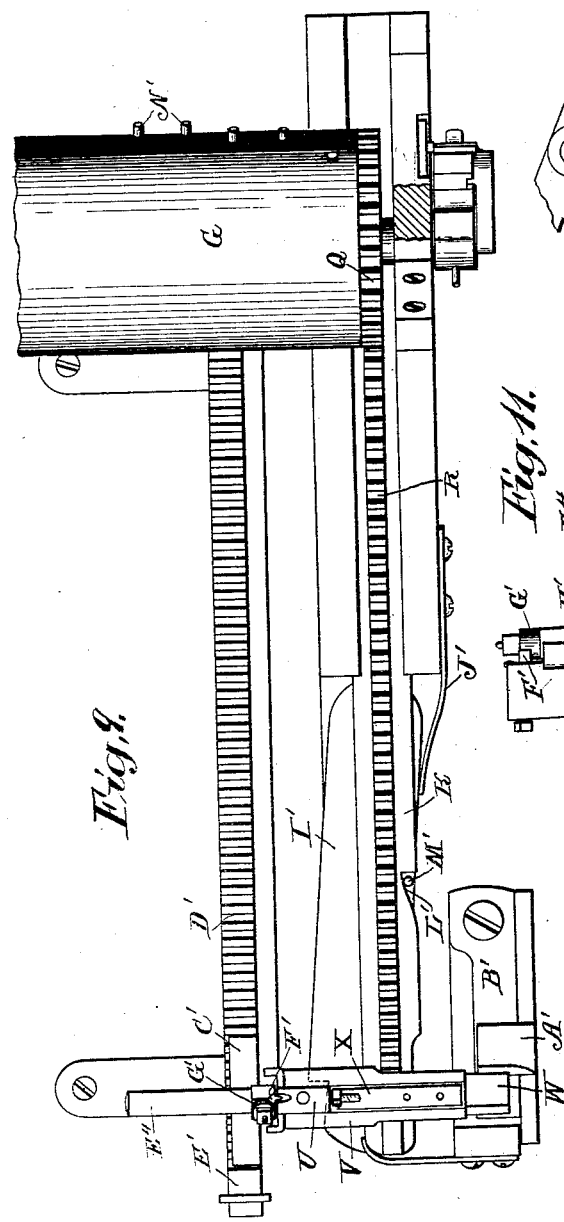
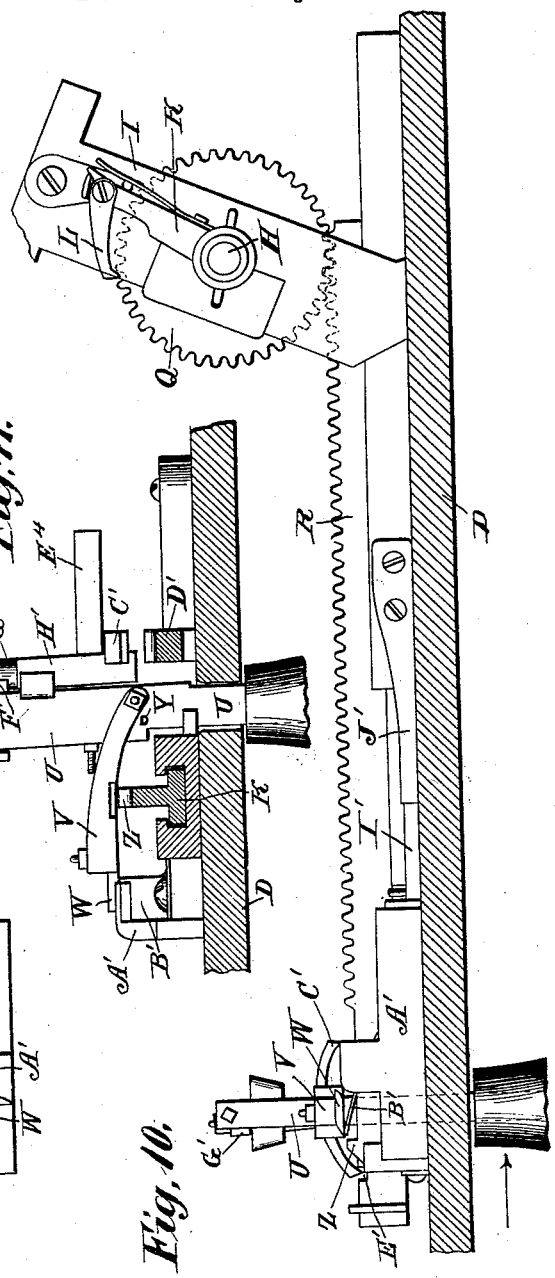

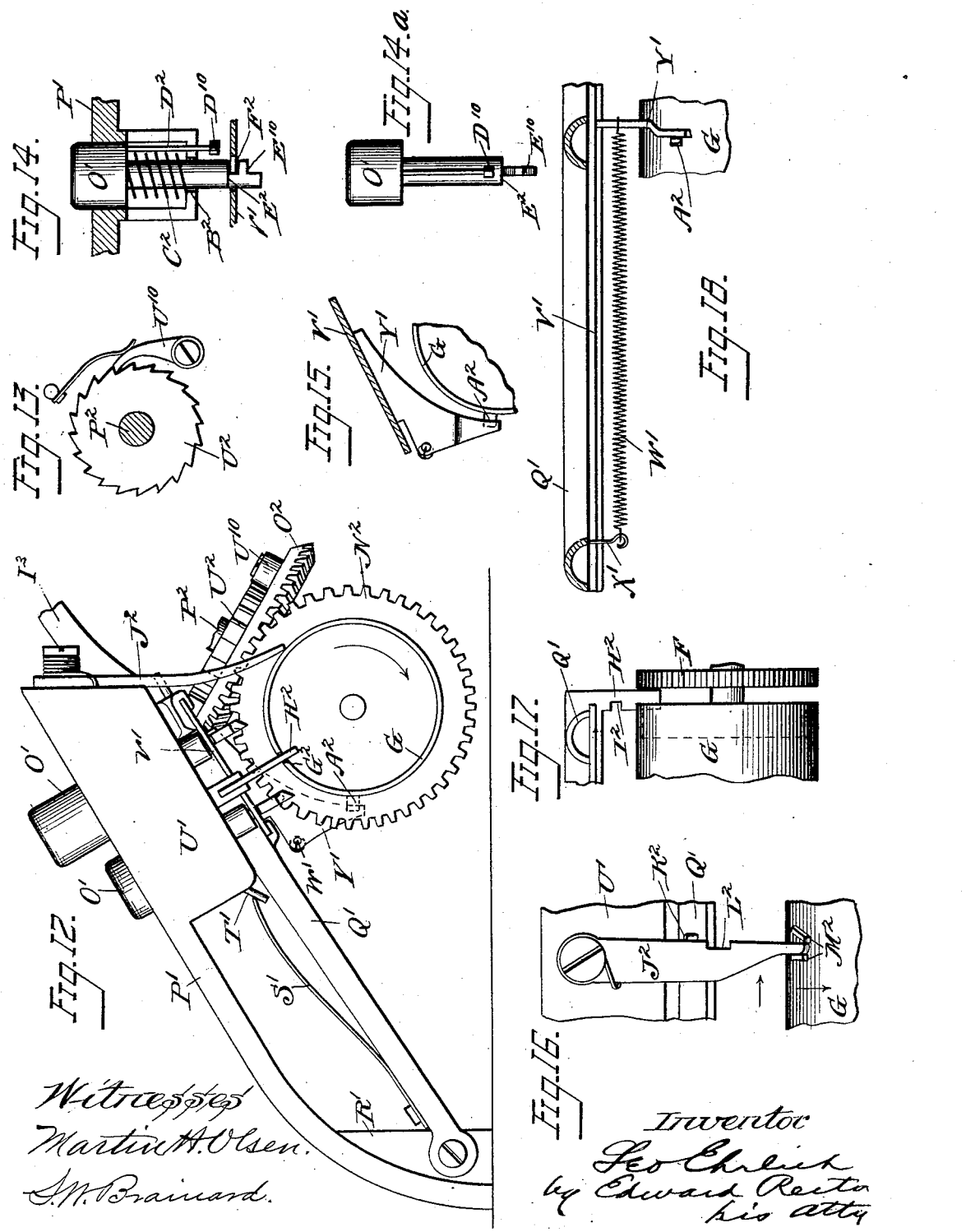

(No Model.)  
12 Sheets—Sheet 9.
L. EHRLICH.
CASH REGISTER, INDICATOR, AND CHECK PRINTER.
No. 560,089. Patented May 12, 1896.
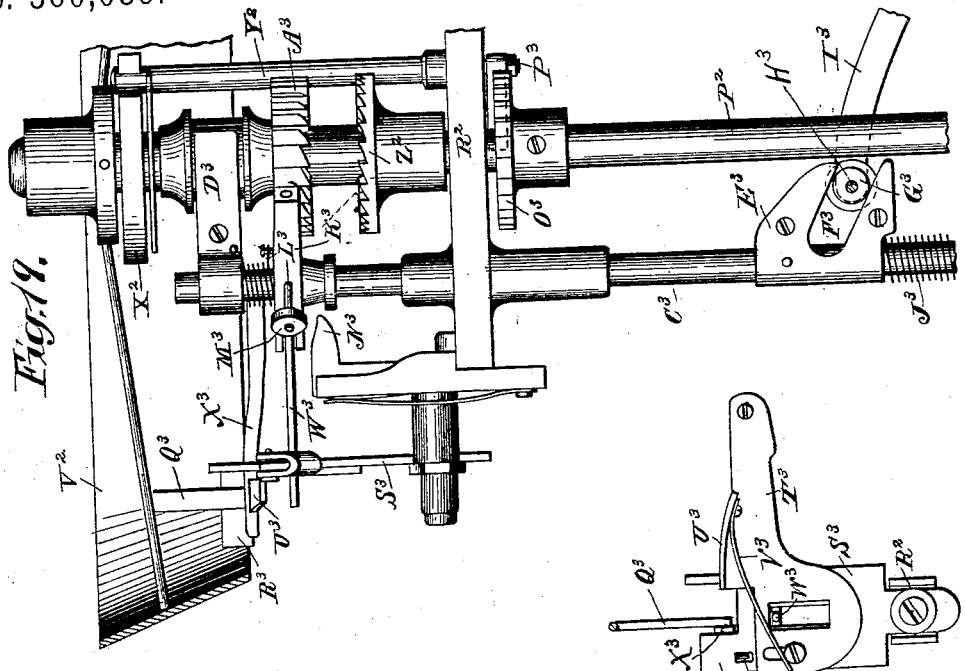
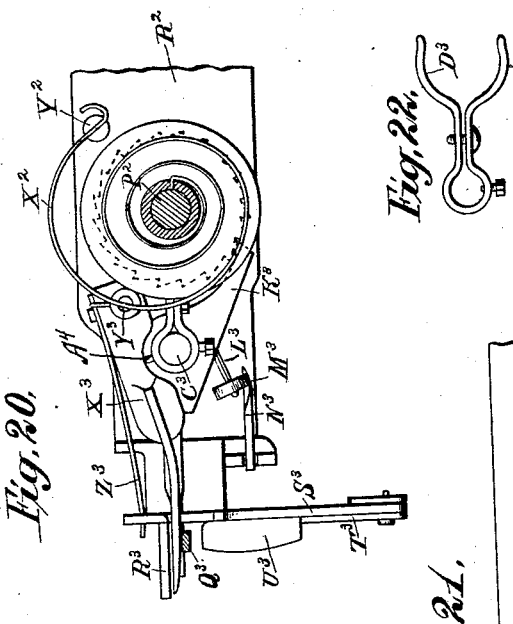
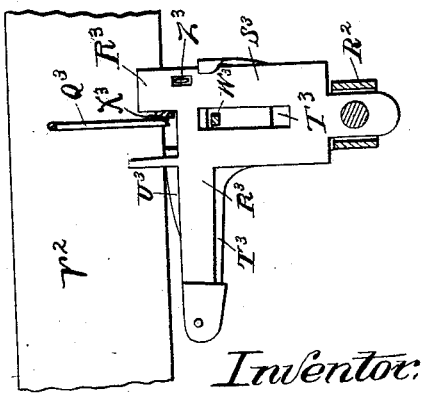
Witnesses.
S. W. Brainard.
Martin H. Olsen.
Inventor:
Leo Ehrlich
by Edward Rector
his atty.

(No Model.) 12 Sheets—Sheet 10.
L. EHRLICH.
CASH REGISTER, INDICATOR, AND CHECK PRINTER.
No. 560,089. Patented May 12, 1896.
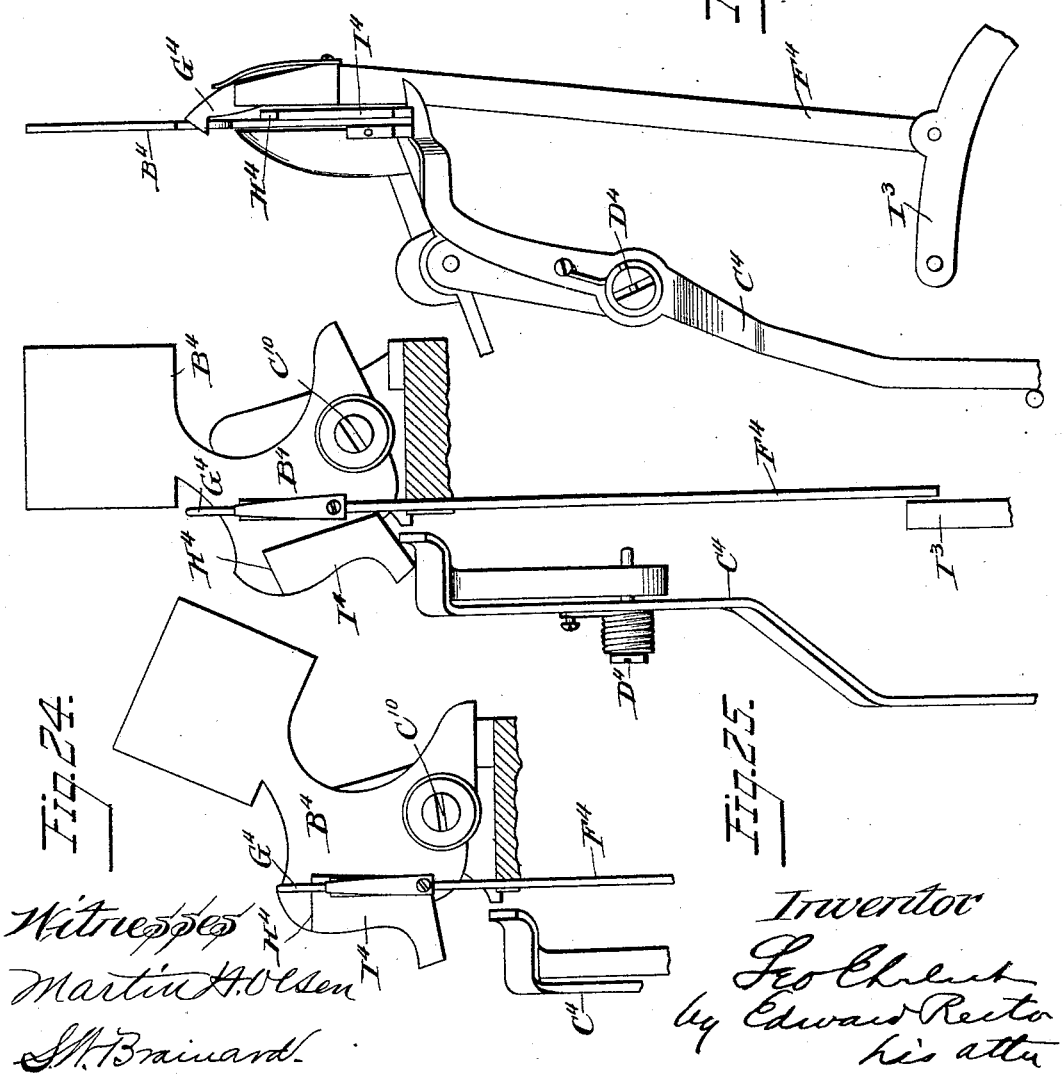

(No Model.) 12 Sheets—Sheet 11.
L. EHRLICH.
CASH REGISTER, INDICATOR, AND CHECK PRINTER.
No. 560,089. Patented May 12, 1896.
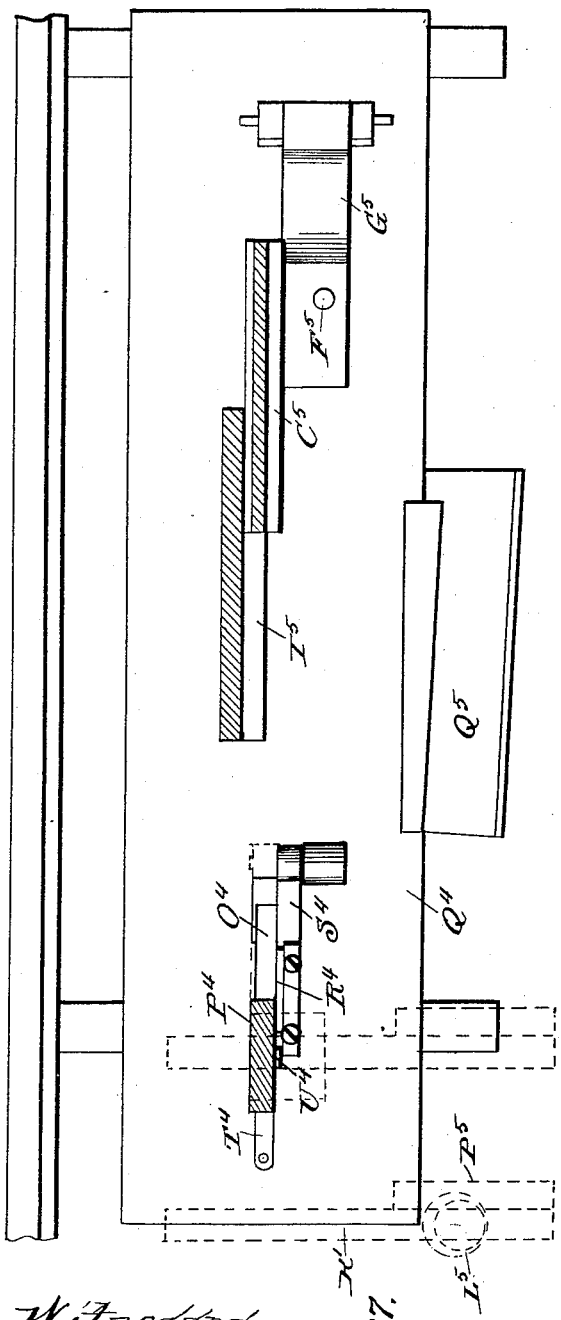
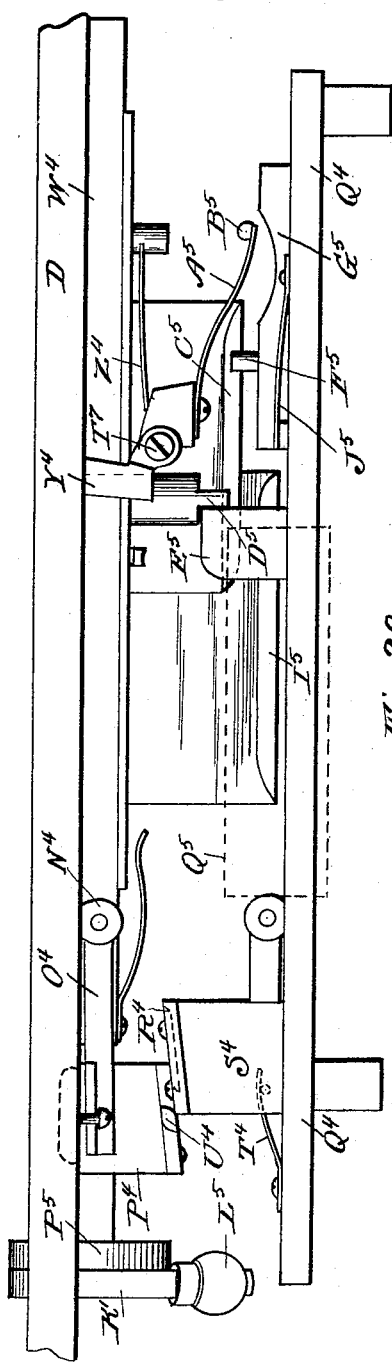

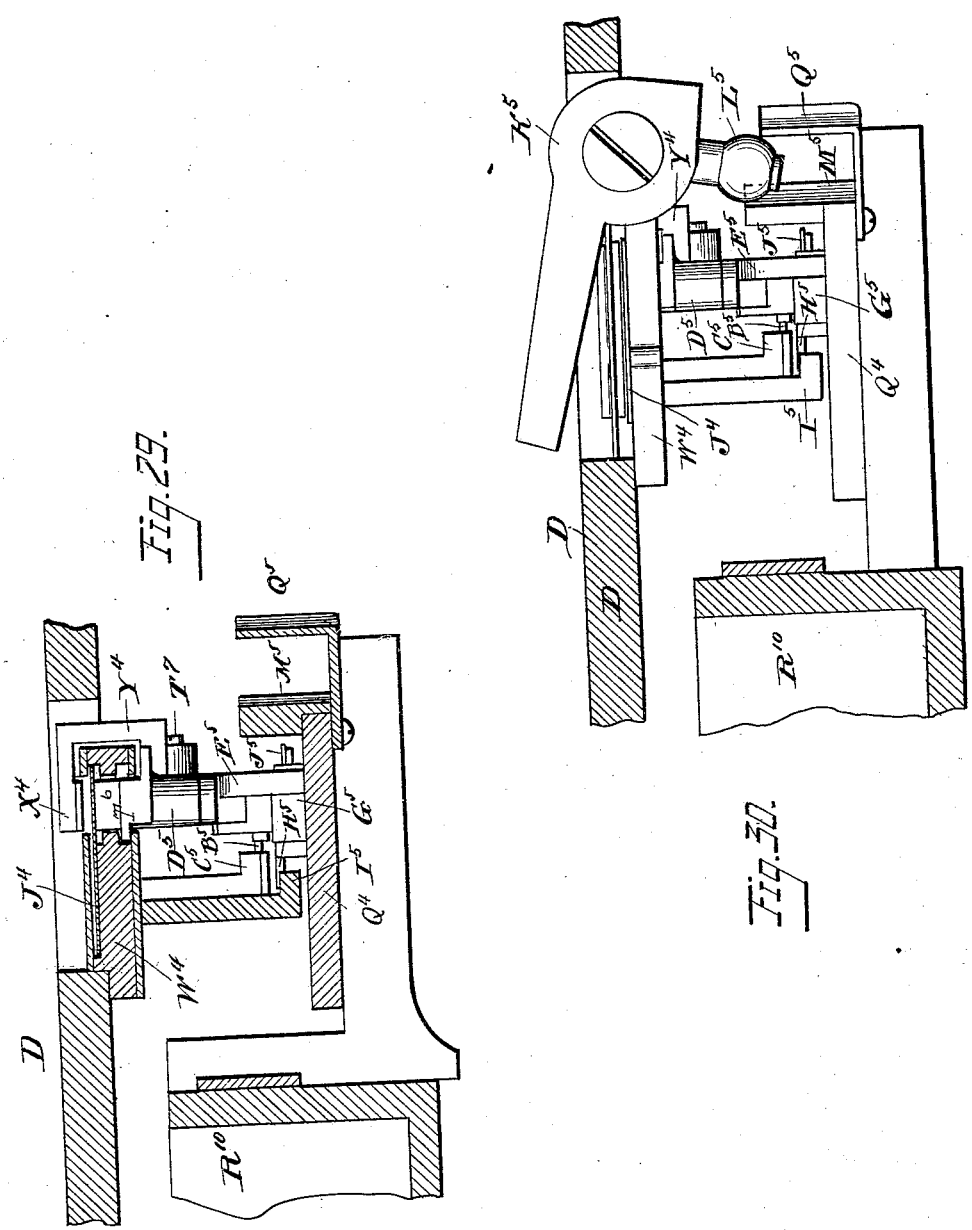

UNITED STATES PATENT OFFICE.

LEO EHRLICH, OF ST. LOUIS, MISSOURI, ASSIGNOR TO THE NATIONAL CASH REGISTER COMPANY, OF DAYTON, OHIO.

CASH REGISTER, INDICATOR, AND CHECK-PRINTER.

SPECIFICATION forming part of Letters Patent No. 560,089, dated May 12, 1896.

Application filed April 5, 1894. Serial No. 506,492. (No model.)

*To all whom it may concern:*

Be it known that I, LEO EHRLICH, a citizen of the United States, residing at St. Louis, in the State of Missouri, have invented a certain new and useful Improvement in Cash Registers, Indicators, and Check-Printers, of which the following is a description, reference being had to the accompanying drawings, forming part of this specification.

My complete machine embodies a registering, an indicating, and a recording mechanism; but the several features of my invention relate to these mechanisms independently considered as well as when associated together in the same machine.

The novelty of the invention will be hereinafter set forth, and specifically pointed out in the claims.

Figure 1:
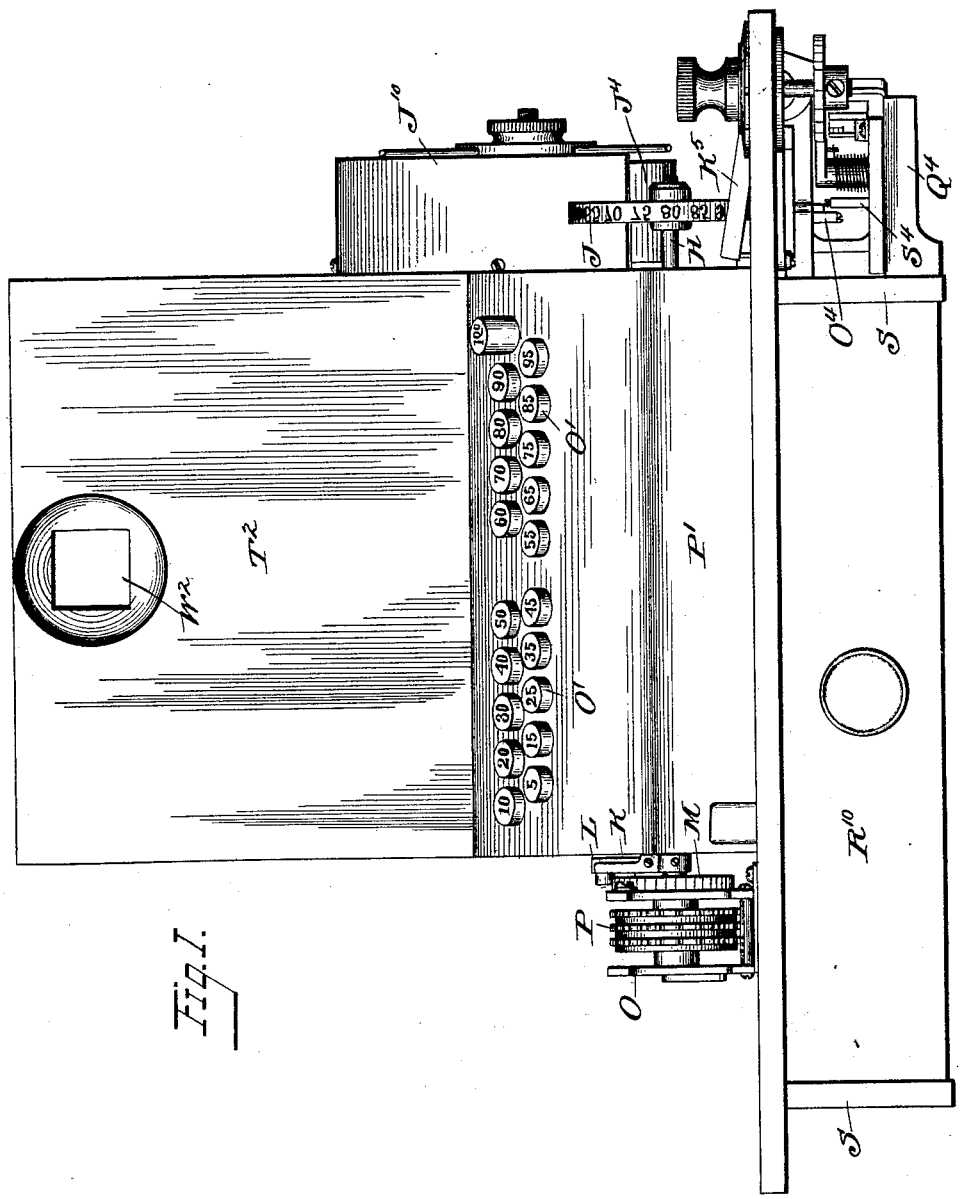
Figure 2:
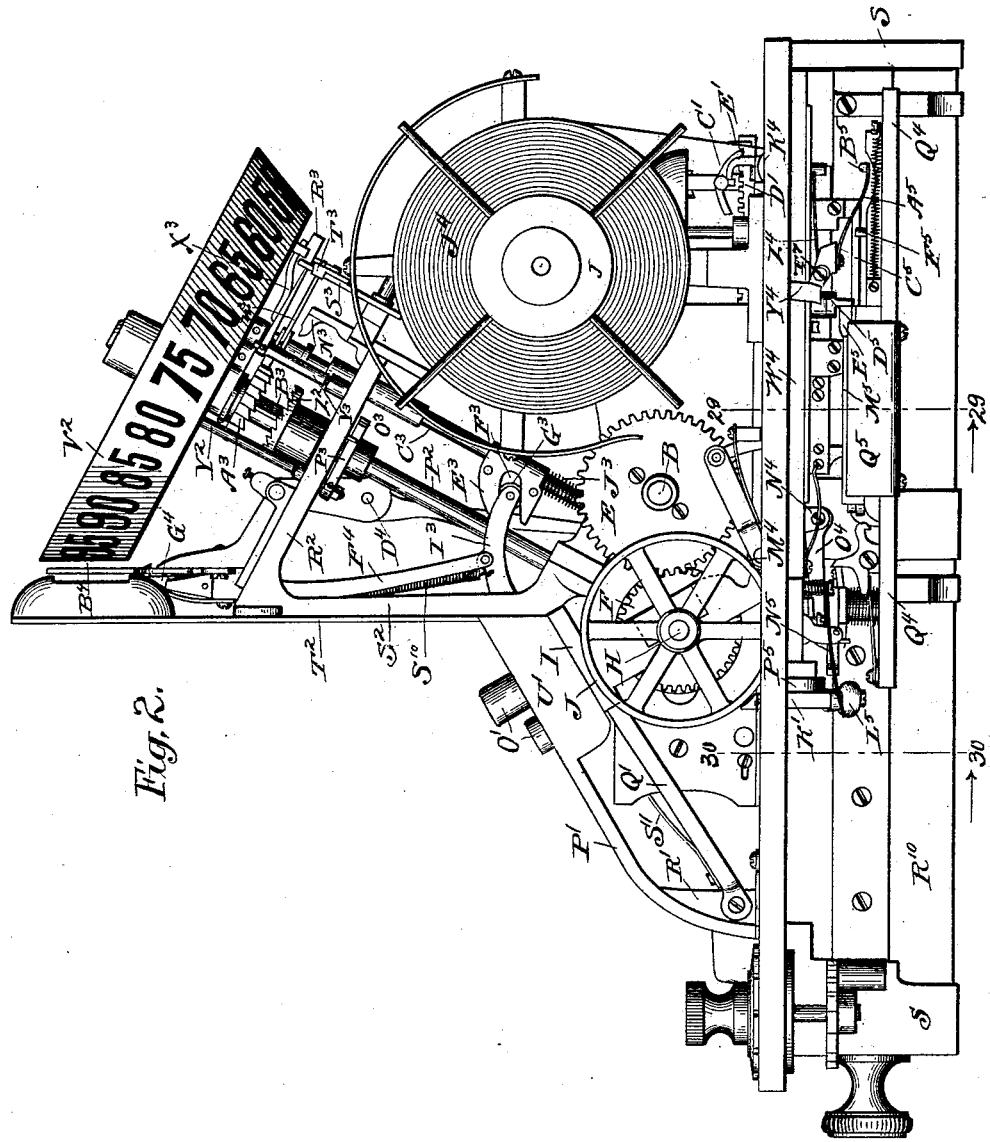
Figure 3:
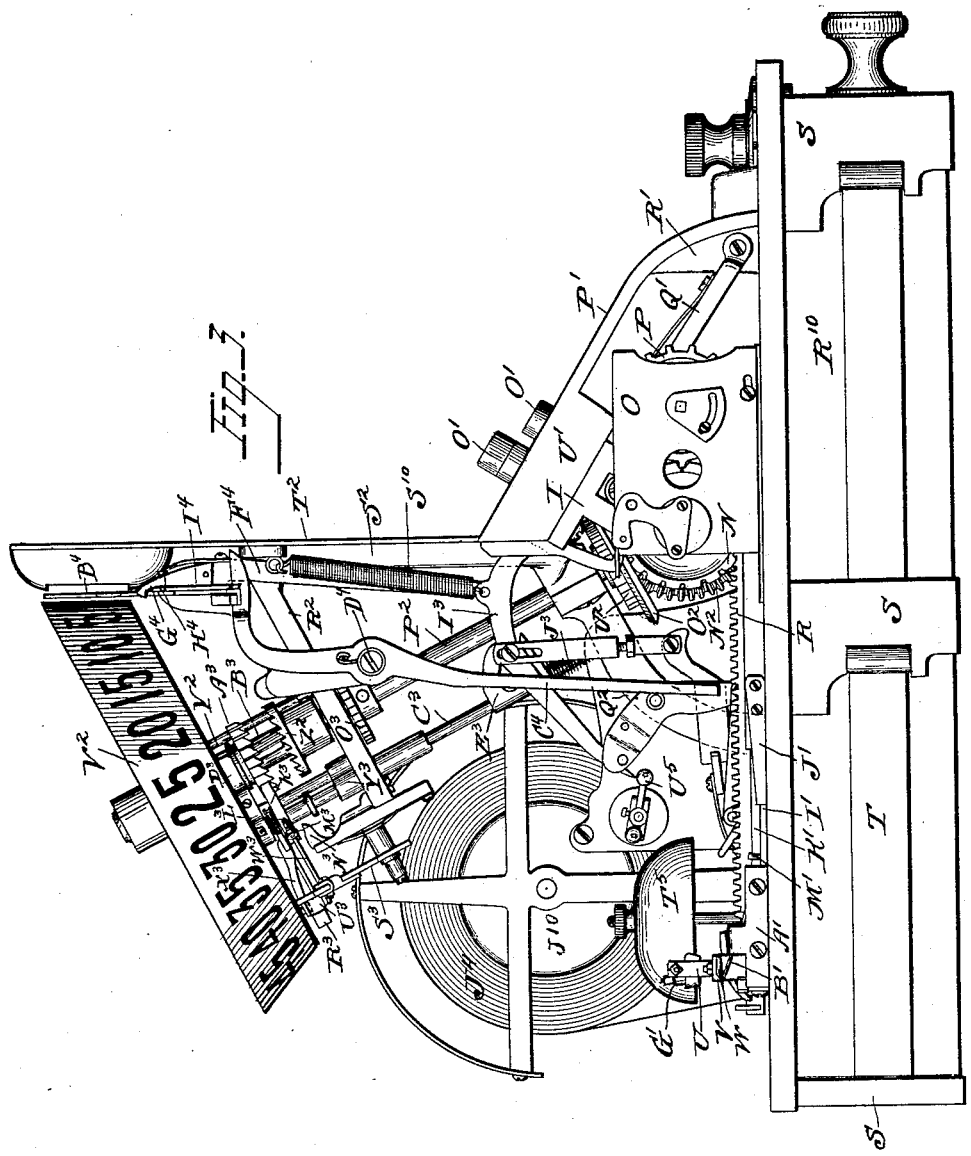
Figure 4:
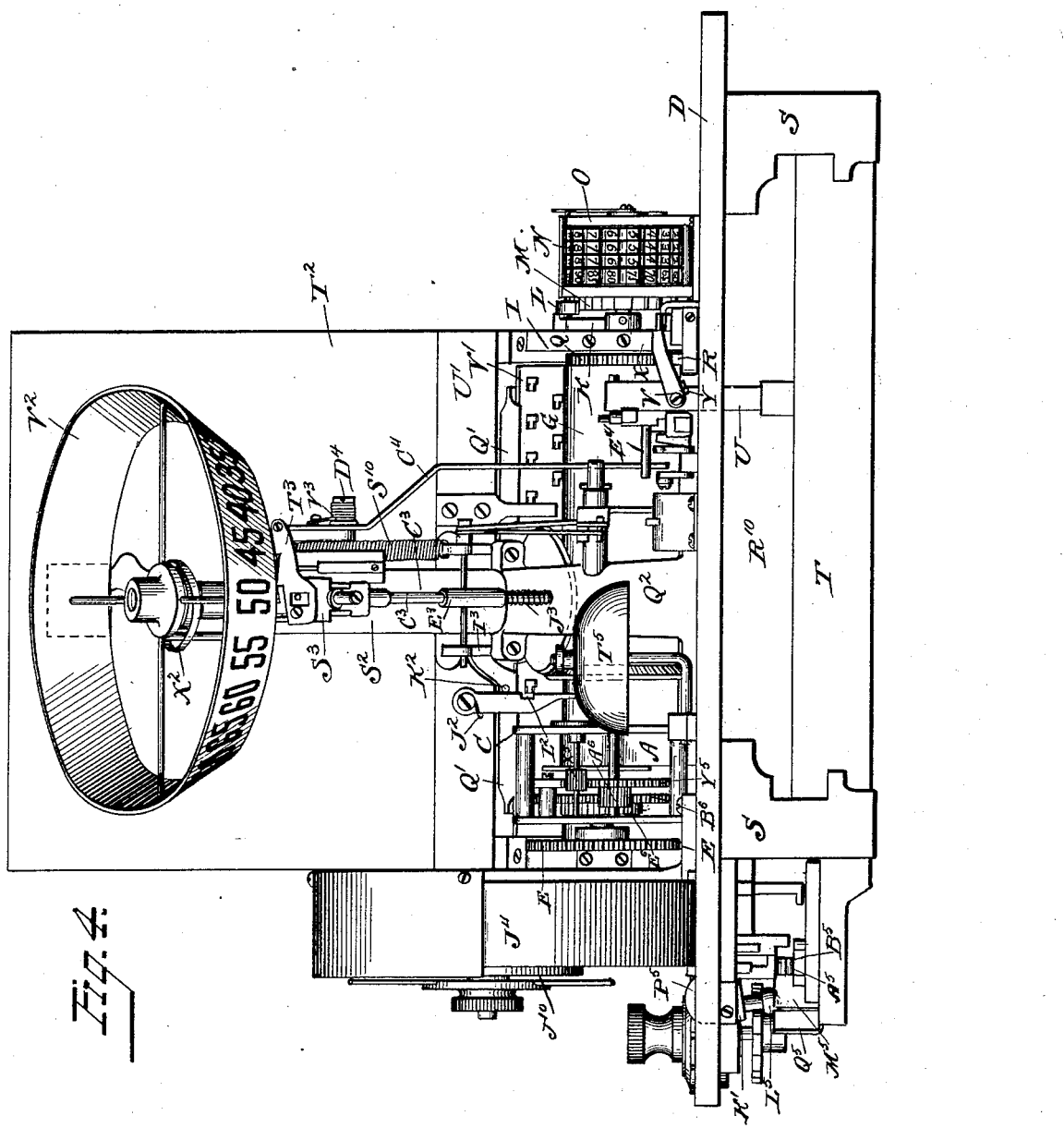
Figure 5:
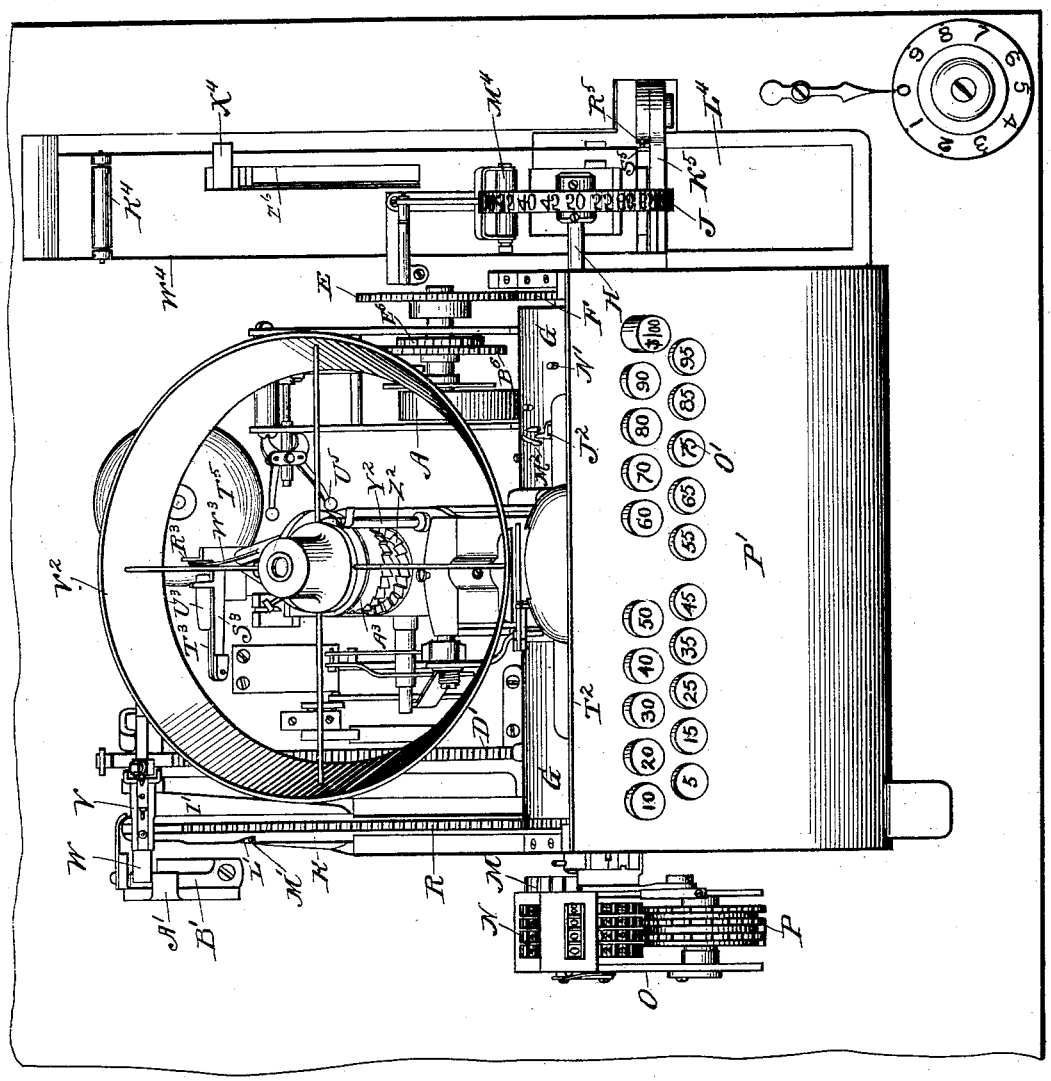

In the accompanying drawings, Figure 1 represents a front elevation of the machine; Fig. 2, an elevation of the right side thereof; Fig. 3, an elevation of the left side thereof; Fig. 4, a rear elevation; Fig. 5, a top plan view; Figs. 6, 7, and 8, enlarged detail views of the motor mechanism, the gong, and its sounding devices, and one end of the rotary cylinder; Figs. 9, 10, and 11, enlarged detail views of the reciprocating rack geared to the rotary cylinder, the resetting devices for such rack actuated by the drawer, the fixed rack and coöperating pawl, and associated devices; Fig. 12, a detail side elevation of the lower forward part of the machine, showing the operating-keys, the vibrating frame and detent-plate coöperating therewith, and one end of the rotary cylinder; Fig. 13, a detail of a ratchet and pawl of the indicating mechanism; Figs. 14 and 14ª, enlarged detail views of one of the operating-keys and coöperating devices; Fig. 15, a detail view of the arm upon the detent-plate and the pin upon the rotary cylinder coöperating therewith; Fig. 16, a detail view of one of the locking devices for holding the detent-plate in depressed position, and Fig. 17 a detail view of the other device for the same purpose; Fig. 18, an enlarged detail of part of the vibrating frame carrying the detent-plate, showing the spring connected to said plate and the pin upon the cylinder coöperating with the arm upon the plate; Figs. 19 to 23, enlarged detail views of the indicating mechanism; Figs. 24 to 26, enlarged detail views of the automatic screen-plate mechanism for the indicator; Fig. 27, a sectional plan view of the extreme right-hand side of the machine beneath the base-plate thereof; Fig. 28, an enlarged detail side elevation of the portion of the right-hand end of the side of the machine beneath the base-plate, showing the devices carried by the drawer and the devices mounted upon the under side of the base-plate and coöperating therewith; Fig. 29, a sectional detail approximately on the line 29 29 of Fig. 2, and Fig. 30 a sectional detail approximately on the line 30 30 of Fig. 2.

The same letters of reference are used to indicate identical parts in all the figures.

The motive power of the machine is a coiled spring, which is wound up by the closing of the money-drawer. This motor is held in check by a detent which is controlled by a series of keys. When any one of said keys is operated, the motor is released and moves the indicator, register, and type-wheel distances corresponding to the value of such key to indicate and register such value and set the type-wheel to print it. Upon then pulling out the money-drawer a platen is forced against the type-wheel to effect the printing. The closing of the drawer winds up the motor-spring and returns the type-wheel to zero or initial position, and also resets some of the actuating parts which had been moved by the motor.

The motor-spring A is coiled around a shaft B, journaled in bearings in an upright frame C, secured upon the horizontal base-plate D of the machine, Figs. 4, 6, and 7. The inner end of the spring A is fastened to the shaft B and its outer end to the lower front cross-rod of the frame C, Figs. 6 and 7. The right-hand end of the shaft B projects beyond the frame C and has fast upon it a gear E, Figs. 2, 4, 6, and 7, which meshes with a gear F, fast upon the right-hand end of a cylinder G, Figs. 6 and 7, extending transversely across the machine and secured upon a shaft or spindle H, journaled in the upright bars I at the opposite sides of the framework. The shaft H has secured upon its extreme right-hand end the type-wheel J, Figs. 1, 2, and 5, while upon its left-hand end is secured a pawl-arm K, carrying a spring-pressed pawl L, Figs. 1, 4, and 10, engaging the ratchet M, Fig. 1, of the primary wheel of a train of registering-wheels N, mounted in an upright frame O upon the base-plate D, Figs. 3 and 4. The transfer-gears P between the registering-wheels are shown in Fig. 1 immediately in front of the registering-wheels.

The cylinder G has fast upon its left-hand end, just within the side bar I of the frame, Figs. 4, 9, and 10, a gear Q, which meshes with a forwardly and backwardly reciprocating rack-bar R, mounted in suitable guideways upon the base-plate D, Figs. 3, 4, 5, 9, 10, and 11. When the cylinder G is turned in one direction, the rack-bar R is slid in that direction, and vice versa.

The base-plate D of the machine is mounted upon supports S, and fitted to slide back and forth in suitable guideways beneath the plate is the money-drawer $R^{10}$. A post U, secured to the rear side of the drawer, Figs. 4, 10, and 11, projects upward through a slot in the plate D, extending longitudinally of the rack-bar R, beside the same, Fig. 5. Pivoted to this post by ears or side arms is a bar V, projecting over the rack-bar R and terminating at its outer end in an oppositely-beveled cam-plate W, Figs. 3, 9, 10, and 11. A spring X, secured at its outer end to the upper side of this bar V in a shallow groove therein, is bent upward at its inner end and bears against a pin projecting from the side of the post U, serving to press the bar V downward against a stop-pin Y upon the rear side of the post, Figs. 4 and 11. The rear end of the rack-bar R has upon its upper side a lug Z, having a beveled or rounded rear side, Fig. 10, upon or immediately above which lug the bar V rests when the parts are in normal position. If the detent holding the motor in check be released and the motor permitted to turn the cylinder G, the rack-bar R will be slid forward and the lug Z be withdrawn from beneath the bar V, whereupon the spring X will press the latter downward against the stop-pin Y. This will carry the bar V into the horizontal plane of the lug Z, and when the drawer is pulled out the bar V will ride up over the lug and snap down in front of it, so that when the drawer is pushed in again the bar will engage the abrupt forward side of the lug and carry the rack-bar back to normal position. In this manner after the rack-bar has been moved forward at any given operation of the machine the subsequent opening and closing of the drawer will restore it to normal position. As the drawer reaches closed position the cam-plate W on the end of the bar rides under the upper horizontally-bent portion of a fixed plate A', secured to the base-plate D, Figs. 2, 5, 9, 10, and 11, and is thereby held in depressed position while it travels over and depresses an upwardly-bent spring B' beneath the plate A', the spring pressing the plate W and bar V upward. As soon as the plate W clears the rear end of the plate A' the spring B' throws it upward and causes it to clear the lug Z upon the rack-bar and come to rest immediately above it, Figs. 3 and 10. In this manner after the rack-bar has been returned to normal position by the bar V the latter is thrown out of the path of the lug Z and the rack-bar left free for another forward movement.

For the purpose of insuring a full opening and closing of the drawer at each operation the post U has pivoted to its side opposite the parts just described a double-toothed pawl C', Figs. 2, 9, 10, and 11, which coöperates with a fixed rack D', secured to the base-plate D. Projections E' at the opposite ends of the rack reverse the position of the pawl at the ends of its strokes, while a spring-detent F', engaging a roller G' upon the upper end of the vertical arm H', which carries the pawl, serves to yieldingly hold the pawl in the position to which it is moved upon its pivot.

For the purpose of locking the drawer in its closed position and preventing it being opened until the rack-bar R has first been moved forward there is provided a latch-plate I', Figs. 3, 5, 9, and 10, pivoted at its front end to the base-plate D and provided on its right-hand edge near its rear end with a shoulder, which normally stands in the path of the post U, a spring J', bearing against the left-hand edge of the plate, yieldingly holding it in such position. The rack-bar R is secured upon a sliding plate K' somewhat wider than the bar, which plate fits in the grooved guideway for the bar, and this plate has in its left-hand edge a notch L', whose rear side is beveled off to the straight edge of the plate. A pin M' upon the upper side of the latch-plate I' fits in this notch, and when the rack-bar is slid forward the rear side of the notch forces the pin M' and plate I' to the left, thereby carrying the shoulder of the plate I' out of the path of the post U and releasing the drawer.

The cylinder G has upon its surface a number of stop-pins N', Figs. 7, 9, and 12, which coöperate with the inner ends of the push-keys O', Fig. 1. These keys are mounted in the inclined front plate P' of the casing and a housing U' upon the under side of the same, and when any one of them is pressed in its inner end projects into the path of one of the pins N' on the cylinder, so that when the motor is released the cylinder will be turned by it until such pin N' comes in contact with the operated key, whereupon the cylinder will be arrested after having turned a distance corresponding to the value of such key. The detent which holds the motor in check is arranged to coöperate with the entire series of keys and be moved by the operation of any one of them to release the motor. Arranged beneath the inclined front plate P' of the casing is a vibrating frame Q', Figs. 2, 3, 4, and 12, the front ends of whose supporting side arms are pivoted to lugs R' upon the under side of the plate P', Figs. 2, 3, and 12. A flat spring S', secured at its front end to the front cross-bar of the frame Q' at its middle, bears at its rear end upon a pin T', projecting forward from the key-housing U' upon the under side of the plate P'. This spring yieldingly holds the rear side of the frame in its upper and normal position and permits it to be depressed therefrom when any key is pushed in. Mounted in guideways in the rear portion of the frame P' is a plate V', Figs. 1, 2, 12, 14, 17, and 18, extending the full width of the frame and capable of slight endwise movement laterally of the machine. A spring W', connected at its left-hand end to a hook X' upon the under side of the frame P', Fig. 18, and at its right-hand end to an arm or plate Y', secured to and depending from the under side of the plate V', tends to slide the latter to the left. When the cylinder G is in its normal position, a pin A upon its surface, Fig. 12, engages the lower forward end of the arm Y' and holds it in its normal right-hand position against the stress of the spring W'. When the cylinder is turned from normal position, the spring is free to act upon the plate V'. This plate is provided with a series of small rectangular holes, Fig. 14, through which pass the correspondingly-shaped inner ends of the keys. The keys are of the shape shown in Figs. 14 and 14$^a$. Their enlarged tubular outer ends fit snugly in circular apertures in the plate P', while their reduced inner ends or stems pass through and fit smaller circular apertures in the bottom plate B$^2$ of the key-housing. Coiled springs C$^2$, surrounding the stems of the keys and confined between the plate B$^2$ and the shoulders formed by their enlarged outer ends, press them outward and yieldingly hold them in normal position. Small rods D$^2$, secured at their outer ends to the tubular portions of the keys and passing at their inner ends through the plate B$^2$ and having nuts D$^{10}$ screwed upon them beneath the plate B$^2$, serve to further guide the keys and limit their outward movement under the action of the spring C$^2$. The keys are provided with shoulders E$^2$ above the plate V', formed by the junction of their rectangular inner ends with their rounded stems, and are provided on their right sides immediately below said shoulders with notches F$^2$ to permit the movement of the plate V' to the left under the influence of the spring W', as before described. When any key is pressed in, its shoulder E$^2$ will bear against the plate V' and depress said plate and the frame Q' with it. At the full limit of downward movement of the parts the inner ends of the unoperated keys just extend into the apertures in the plate V', and their ends are cut away upon their right sides to accommodate the lateral movement of the plate V', forming shoulders E$^{10}$. When, therefore, a key is depressed and the plate V' pulled to the left by its spring, the portion of the plate V' immediately at the right of the operated key will enter its notch F$^2$, while the portions of the plate adjacent the ends of the unoperated keys will move to the left beneath the shoulders E$^{10}$, before described, and thus all of the keys will be locked by the plate V' until it is slid back to the right to normal position.

The right-hand end of the cylinder G is open or provided with a flange and has in it a notch G$^2$, Fig. 6, in which fits a locking arm or plate H$^2$, secured to and depending from the under side of the frame Q', Figs. 12 and 17. This plate is provided in its left-hand side with a notch I$^2$, which normally stands above the surface of the cylinder, the body of the plate fitting in the notch G$^2$ in the cylinder and locking the cylinder from movement under the influence of the motor. When any key is depressed to its limit of movement and the frame Q' carried down with it, the body of the plate H$^2$ will pass inside the cylinder G and its notch G$^2$ be brought opposite its shell or flange, whereupon the cylinder will be released and turned by the motor until one of its pins N' contacts with the operated key and arrests it. At the beginning of movement of the cylinder the plate V', as soon as the pin A$^2$ is carried away from the arm Y', will be pulled to the left by the spring W' and lock all of the keys. When the money-drawer is then pulled open and closed, the cylinder will be restored to normal position by the rack-bar R, and as it reaches normal position and the notch G$^2$ comes opposite the plate H$^2$ the frame Q' will be released and thrown upward to normal position by its spring S', while the pin A$^2$ will engage the arm Y' and move the plate V' to the right, unlocking the keys and permitting the operated one to be thrown outward by its spring.

For the purpose of holding the frame Q' in depressed position independently of the engagement of the locking-plate H$^2$ with the open or flanged end of the cylinder, which would also serve that purpose, there is provided a latch-arm J$^2$, Figs. 4, 12, and 16, pivoted at its upper end to the rear side of the key-housing on the plate P' and resting at its lower end upon the surface of the cylinder. A spring coiled around the pivot of the arm presses it toward the left side of the machine against a pin K$^2$ upon the rear side of the frame Q'. The latch-arm has in its left side a notch L$^2$, which engages the pin K$^2$ when the frame Q' is depressed and holds it in such position until the latch-arm is swung to the right again. When the parts are in normal position, the lower end of the latch-arm fits between two lugs M$^2$ M$^2$ upon the surface of the cylinder, Fig. 16. These lugs are inclined toward the vertical transverse plane of the cylinder, so that there is an inclined guideway formed between them, in which the lower end of the latch-arm fits. When the cylinder is turned from normal position and these lugs are carried away from the end of the latch-arm, the latter's spring throws it to the left and engages its notch with the pin $K^2$ on the frame $Q'$. When the cylinder is restored to normal position, the lugs $M^2$ reëngage the end of the arm and throw it back to normal position, disengaging its notch from the pin and releasing the frame $Q'$, which is then restored to its normal upper position by the spring $S'$. The provision of the latch-arm $J^2$ for holding the frame $Q'$ in depressed position relieves the friction which would otherwise occur between the locking-plate $H^2$ and inner surface of the cylinder.

Having now described the manner in which and the means by which the motor is controlled and caused to impart different degrees of movement to the cylinder, I will next describe the indicating mechanism which is actuated by said cylinder.

The cylinder has fast upon it at the right of its middle a beveled gear $N^2$, which meshes with a second beveled gear $O^2$, loose on the lower end of an inclined shaft $P^2$, which is journaled at its lower end in bearings in a curved bar $Q^2$ of the framework and toward its upper end in a bearing in a rearwardly-extending and downwardly-inclined bar $R^2$, which in this instance is formed integral with the vertical bar $S^2$, to which the front plate $T^2$ of the casing is secured. Fast upon the shaft $P^2$ immediately above the gear $O^2$ is a ratchet $U^2$, which is engaged by a pawl $U^{10}$, pivoted upon the upper side of the gear $O^2$, so that the shaft $P^2$ will be turned with the cylinder G and gear $O^2$ in one direction, but not in the other. The indicator-wheel $V^2$ is loosely mounted upon the upper end of the shaft $P^2$. Its rim corresponds in shape to a transverse section of an inverted cone, so that it presents a vertical surface opposite the sight-opening $W^2$ in the front plate $T^2$, and it bears a series of numbers corresponding to those upon the keys $O'$, in this instance representing multiples of five from five to one hundred, or one dollar. A spring $X^2$, Figs. 4, 19, and 20, coiled around the hub of the wheel and secured at its inner end to said hub and at its outer to a fixed post $Y^2$ on the bar $R^2$ of the framework, serves to yieldingly hold the wheel in and return it to initial position with its number indicating one dollar opposite the sight-opening $W^2$. Fast upon the shaft $P^2$ immediately above the bar $R^2$ is one member $Z^2$ of a clutch whose coöperating member $A^3$ is splined upon a depending sleeve $B^3$, integral with the hub of the indicator-wheel $V^2$. When the clutch member $A^3$ is in the normal position shown, the indicator is free to turn independently of the shaft $P^2$; but when it is slid downward into engagement with the member $Z^2$ the indicator will be carried with the shaft when the latter is turned by the gear $O^2$. The clutch-shifter consists of a sliding rod $C^3$, mounted in bearings in the bars $Q^2 R^2$, parallel with the shaft $P^2$ and having fast upon its upper end a yoke-arm $D^3$, which embraces the hub of the clutch member $A^3$ and fits between the end flanges thereof. Near its lower end the rod $C^3$ has fast upon it a forwardly-projecting plate $E^3$, having in it an inclined slot or recess $F^3$, in which fits and travels a roller $G^3$ upon a cross-rod $H^3$, connecting the rear ends of two curved arms $I^3$, rigidly secured to and projecting rearwardly from the key-frame $Q^7$, before described. When said frame is depressed by the setting of a key, the downward and rearward movement of the roller $G^3$ will cause it to travel rearward in the slot $F^3$ and, bearing against its inclined lower wall, force the rod $C^3$ downward against the resistance of a spring $J^3$, coiled around the rod below the plate $E^3$. Thus at each setting of a key the clutch member $A^3$ will be engaged with the member $Z^2$, so that the subsequent turning of the shaft $P^2$ under the influence of the motor will turn the indicator in the same direction and put under tension its coiled resetting-spring $X^2$.

When the drawer is opened and closed and the frame $Q'$ moved upward to normal position by its spring $S'$, as heretofore explained, and also by a coiled spring $S^{10}$, connected to one of the arms $I^3$, Fig. 2, the rod $C^3$ will likewise be lifted to normal position, carrying the clutch member $A^3$ with it and disengaging it from the member $Z^2$. To prevent the indicator being then at once returned to initial position by its spring $X^2$ and to hold it in the position to which it has been moved until the machine is operated to make another indication, the periphery of the clutch member $A^3$ is formed into a ratchet which is engaged by a holding-pawl $K^3$, pivoted upon the shifter-rod $C^3$ below the arm $D^3$ and spring-pressed against the ratchet. When the indicator is turned forward with the shaft $P^2$, the teeth of the ratchet slip under the pawl, and when the clutch members are disengaged the pawl holds the ratchet and indicator from backward movement under the stress of the spring $X^2$.

At the beginning of each operation of the machine the pawl $K^3$ is disengaged from the ratchet to permit the spring to restore the indicator to initial position preparatory to the new indication. To this end the pawl has projecting rearwardly from its left-hand side a stud $L^3$, upon which is mounted an anti-friction-roller $M^3$. When the rod $C^3$ is moved downward at the beginning of an operation of the machine, the roller $M^3$ contacts with the upper end of a trip-arm $N^3$, pivoted in the bar $R^3$, Figs. 3, 19, and 20, and as it rides over its beveled right-hand side rocks the pawl $K^3$ on its pivot and disengages its tooth from the ratchet, thereby releasing the indicator and permitting its spring to return it to initial position. When the roller $M^3$ clears the trip-arm $N^3$, the pawl is reëngaged with the ratchet, ready to hold the indicator in the position to which it may be moved. The trip-arm $N^3$ is free to tilt rearward when the roller $M^3$ contacts with it in the return upward movement of the parts, so that the pawl remains engaged with the ratchet. In this manner the pawl is tripped to release the indicator at the beginning of each operation to permit the indicator to be reset by its spring, and is then reëngaged with the ratchet to hold the indicator in position to exhibit the new indication. A ratchet $O^3$, fast upon the shaft $P^2$ beneath the bar $R^2$ and engaged by a pawl $P^3$, pivoted to the under side of said bar, prevents backward movement of said shaft.

When the indicator is in normal position, an arm or lug $Q^3$, depending from one of its spokes, Figs. 19, 20, 21, and 23, rests immediately to the left of the rearwardly-projecting arm $R^3$ of a stop-plate or frame $S^3$, pivoted to the rear end of the frame-bar $R^2$ and capable of slight rocking movement upon its pivot, Figs. 21 and 23. Pivoted to the rear side of the frame $S^3$ is a latch-plate $T^3$, having a beveled upper surface at $U^3$, over which the arm $Q^3$ on the indicator rides as it returns to initial position, slightly depressing the plate $T^3$ against the tension of a spring $V^3$ as it passes and then catching behind the shoulder at the end of the beveled surface $U^3$, when it clears such surface and the plate is thrown upward again by the spring $V^3$. At each return to initial position, therefore, the indicator is caught by the latch-plate $T^3$. Pivoted between ears fast upon the rear side of the sliding shifter-rod $C^3$ is an arm $W^3$, which extends rearwardly through an opening in the frame $S^3$ and through a coincident opening in the latch-plate $T^3$, Figs. 19, 21, and 23. The opening in the former is larger than that in the latter, Fig. 21. When the rod $C^3$ is slid downward by the pressing in of a key to engage the clutch members, the arm $W^3$ will contact with the bottom of the opening in the latch-plate $T^3$ and depress the latter against the pressure of the spring $V^3$ and carry its locking-shoulder out of the path of the arm $Q^3$ upon the indicator and permit the latter to be turned forward by the motor. The provision of the latch-plate $T^3$, coöperating with the arm $Q^3$ on the indicator, prevents the latter rebounding from the contact of its arm $Q^3$ with the stop-arm $R^3$ when the indicator is reset by its spring, so that the indicator can only move forward when the operated key has been pressed in far enough to cause the engagement of the clutch members and the turning of the indicator by the motor.

For the purpose of preventing the full depression of the operated key and consequent engagement of the clutch members, release of the motor, and turning forward of the indicator before the latter has first been completely reset to initial position there is provided a swinging stop-arm $X^3$, supported on a vertical post $Y^3$ on the bar $R^2$ and extending at its rear end between the stop-arm $R^3$ of the frame $S^3$ and the locking-shoulder of the latch-plate, Fig. 20. A spring $Z^3$, secured at its front end to the side of the arm $X^3$ and confined at its rear end in a hole in the frame $S^3$, presses the arm $X^3$ toward the left and tends to hold it against the sliding shifter-rod $C^3$, beneath a lug $A^4$ thereon. When the arm $X^3$ rests in this position, the contact of the lug $A^4$ with it, when a key is pressed in and the rod $C^3$ slid downward, will prevent a full movement of those parts and hold the clutch members out of engagement. When, however, the indicator is reset to initial position, its arm $Q^3$ will engage the rear end of the arm $X^3$ and carry it to the right against the arm $R^3$, thereby moving its forward portion from beneath the lug $A^4$ on the rod $C^3$ and unlocking the parts, as in Fig. 20, to permit a full depression of the operated key, engagement of the clutch members, release of the motor, and consequent turning forward of the indicator to the new indication. In this manner and by this means a complete resetting of the indicator at each operation is insured.

The purpose of pivoting the stop-frame $S^3$ upon the framework, instead of rigidly securing it thereto, is to permit the indicator to oscillate back and forth through a complete revolution when the amount of one dollar is to be indicated. The indicator bears a series of twenty numbers representing multiples of five from five to one hundred, or one dollar. When in initial position, the latter number stands opposite the sight-opening in the front plate, but is hidden by the screen hereinafter described. If it be desired to indicate and register the amount of one dollar, the indicator must be given a complete revolution and its same number be brought opposite the sight-opening again. When given such complete revolution, its stop-arm $Q^3$ will contact with the right side of the arm $R^3$ of the frame $S^3$ and rock the latter slightly to the left on its pivot, and when returned to initial position by a complete revolution in the opposite direction the arm $Q^3$ will contact with the left side of the arm $R^3$ and rock the frame $S^3$ to the right again.

For the purpose of hiding the numbers upon the indicator while it is being returned to initial position and moved forward to the new indication there is provided an automatic screen-plate which covers and uncovers the sight-opening in the front plate of the casing. This screen-plate $B^4$, of the irregular shape shown in Figs. 24 and 25, is pivoted to the framework at $C^{10}$, so that when the frame is tilted to its extreme right-hand position, Fig. 24, to expose the indicator its center of gravity is slightly to the right of its pivot, so that it will remain in such position until it is tilted to the left far enough to carry its center of gravity to that side of its pivot, whereupon it will fall over in that direction to the position shown in Fig. 24 and close the sight-opening. For the purpose of tilting the plate from the latter position to its right-hand one to expose the indicator there is provided a lever $C^4$, Figs. 3, 24, 25, and 26, pivoted to the framework at $D^4$ and having its forwardly-bent upper end extended under the plate $B^4$. A spring coiled around its pivot and bearing against the lever yieldingly holds it in the position shown, with its lower end resting against a suitable stop. When the drawer is pulled out, a rod E⁴, projecting laterally from the right side of the post U, carried by the drawer, Figs. 5, 9, and 11, will engage the lower end of the lever C⁴ and carry it forward, tilting its upper front end upward and throwing the screen-plate to the right to expose the indicator, whereupon gravity will maintain the plate in such position until it is positively moved to the left again.

For the purpose of tilting the plate to the left far enough to carry its center of gravity to the left of its pivot and permit the plate to move on to position to close the sight-opening and hide the indicator there is provided a rod F⁴, Figs. 3, 24, 25, and 26, pivoted at its lower end to the left-hand one of the two arms I³ of the frame Q' and extending at its upper end in front of the screen-plate and having pivoted in it a hook G⁴, spring-pressed toward the plate and adapted to coöperate with a ledge or shoulder H⁴ thereon, such ledge or shoulder in the present instance consisting of the upper edge of a small plate I⁴, secured upon the front face of the plate B⁴. When the plate B⁴ is in its right-hand position, the hook G⁴ rests just above the shoulder H⁴, Fig. 24, so that when a key is pushed in and the frame Q' depressed and the rod F⁴ pulled downward the hook will engage the shoulder and tilt the plate to the left far enough to cause it to fall by gravity to the position shown in Fig. 25. When the money-drawer is then opened, the lever C⁴ will throw the plate B⁴ back into its right-hand position. In such movement the right-hand edge of the plate I⁴ will slip under the nose of the hook G⁴ and the latter will rest against its forward side until the drawer is closed and the frame Q' released and returned to normal position by its springs, whereupon the rod F⁴ will be again lifted to the position shown in the drawings and the hook G⁴ will catch over the upper edge of the plate I⁴, ready for the next operation. It will thus be seen that at the beginning of each operation the pressing in of the key causes the screen-plate to move over the sight-opening and hide the indicator and that it then remains so hidden until the money-drawer is opened.

As heretofore explained, Fig. 1, the left-hand end of the supporting-spindle H of the cylinder G has fast upon it the pawl-arm K, carrying the pawl L, spring-pressed into engagement with the ratchet M of the primary registering-wheel, so that at each operation of the machine the forward movement of the cylinder under the impulse of the motor will be transmitted to the registering mechanism and an amount corresponding to the value of the operated key and the number displayed by the indicator be added thereon. The opposite end of the spindle H has fast upon it the type-wheel J, and the parts coöperating with such wheel may be next described.

The supply of paper strip J⁴, upon which the various amounts indicated and registered are printed by the type-wheel J, is carried upon a reel J¹⁰, suitably supported on the framework, Fig. 2. From the reel J¹⁰ the strip is led downward beneath a roller K⁴ and thence forward along a guideway in a plate W⁴, secured in a long narrow opening in the base-plate D beneath the type-wheel and out through an upwardly-inclined chute at L⁴, Fig. 5. An inking-roller M⁴, journaled in a spring-pressed frame, bears against the type-wheel and inks the types. Pivoted at its rear end between lugs N⁴ upon the under side of the base-plate D, Figs. 1, 2, 27, and 28, is an arm O⁴, whose front end carries an impression-platen P⁴, adapted to be forced upward at each opening of the drawer to carry the paper strip against the type-wheel to effect the printing. The money-drawer carries upon its right-hand side a laterally-projecting framework Q⁴, Figs. 28, 29, and 30, upon which are mounted various devices coöperating with others mounted in supports upon the under side of the base-plate D. Among other parts carried by the framework Q⁴ is a cam R⁴, Figs. 1 and 27, adapted to ride under a lug U⁴ upon the impression-platen P⁴ when the drawer is opened and force it upward against the type-wheel. This cam is formed upon the side of an arm S⁴, pivoted at its rear end to a lug upon the framework Q⁴, and pressed downward at its front end by a spring T⁴. The front and rear ends of the cam are beveled in opposite directions. As the drawer is pulled outward the downwardly-inclined front end of the cam will ride under the lug U⁴ upon the side of the impression-platen or its supporting-arm and force the platen upward against the type-wheel. In the rearward movement of the drawer the upwardly-inclined rear end of the cam will engage the lug U⁴ and cause the cam to ride over the upper side of the lug, lifting its supporting-arm in so doing, and when it clears the lug the spring T⁴ will press it down to normal position. In this manner the impression-platen is actuated by the opening of the drawer and allowed to remain unmoved during the closing of it.

The means for advancing the paper strip consists of a reciprocating gripping device mounted to slide back and forth in line with the travel of the strip. This gripping device consists of a slide T⁶, mounted in the plate W⁴ beneath the paper strip, Fig. 29, and a pivoted gripping-jaw X⁴, moving and coöperating with the slide. This jaw is carried by an irregularly-shaped arm Y⁴, which is pivoted to the under side of the slide at T⁷, beneath the plate W⁴, Fig. 28, extends upward outside the plate, and is then bent inward over the slide. The plate W⁴ has a slot extending the length of the travel of the gripping devices, Fig. 5, to permit the jaw and slide to grip the strip between them. A spring Z⁴, secured at its rear end to the under side of the slide and bearing at its front end against the arm $Y^4$, presses the jaw $X^4$ upward and yieldingly holds it above the slide and paper strip. The arm $Y^4$ has secured to and extending rearwardly from it a curved spring-arm $A^5$, having upon its rear end a rounded lug $B^5$, projecting toward the left into the vertical plane of a fixed cam-plate $C^5$. The front end of this plate is inclined upwardly and the rear end downwardly. In the forward movement of the gripping devices the lug $B^5$ will ride up over the rear end of the plate and travel upon its upper side, thereby rocking the arm $Y^4$ on its pivot and forcing the jaw $X^4$ downward against the paper strip and gripping it between the jaw and slide and causing them to carry it forward with them. When the lug $B^5$ clears the front end of the cam-plate, the spring $Z^4$ will rock the arm back to normal position and lift the jaw $X^4$ above the paper strip. In the backward movement of the parts the lug $B^5$ will ride under the cam-plate and the jaw $X^4$ be thereby positively maintained in its upper position, so that the paper strip remains unmoved.

Inasmuch as it is desired to advance the paper strip but a comparatively short distance each time, the gripping devices are not given the full forward and backward movement of the drawer. The slide $T^6$ has secured to and depending from its under side a post $D^5$, which coöperates with a lug $E^5$ on the drawer-frame $Q^4$ and with a stud $F^5$ upon the upper side of a horizontal bar $G^5$, pivoted at its rear end in the frame $Q^4$. When the bar $G^5$ is in its lower horizontal position, the stud $F^5$ is below the plane of the post $D^5$ on the slide; but as the drawer is pulled outward a beveled lug or projection $H^5$ upon the left side of the bar $G^5$ near its front end, Figs. 29 and 30, rides over a fixed cam-plate $I^5$ and lifts the bar $G^5$, so that the stud $F^5$ contacts with the post $D^5$ and carries the slide $V^4$ forward with the drawer. When the lug $H^5$ clears the front end of the cam-plate $I^5$, the bar $G^5$ drops to horizontal position again, such movement being insured by a flat spring $J^5$, bearing against a pin on the side of the bar, so that the stud $F^5$ is again carried below the horizontal plane of the lower end of the post $D^5$. When the drawer is closed, the stud clears the end of the post and the slide remains unmoved until the lug $E^5$ on the drawer-frame contacts with it and carries it back to normal position. It will thus be seen that the drawer is moved outward part way without moving the paper strip, then carries the strip with it a short distance, and then releases it and completes its movement alone. The impression-platen is actuated in the manner before described at the first forward movement of the drawer, so that the printing is effected before the paper strip is moved. Then the strip is advanced the proper distance and released, and then the printed check is severed from the strip by means to be now described.

Pivoted to a support upon the right side of the fixed plate $W^4$, at its front end, Figs. 1, 5, and 30, is a knife-bar or shearing-blade $K^5$, constituting the horizontal arm of a bell-crank lever and extending to the left across the paper strip in front of the type-wheel. The vertical arm of the lever depends below the base-plate D and carries an antifriction-roller $L^5$, adapted to coöperate with a cam $M^5$, carried by the drawer-frame $Q^4$. A spring $N^5$, bearing against the vertical arm of the bell-crank above the roller $L^5$, Fig. 2, presses said arm inward and yieldingly holds the shearing-arm in the upper position shown to permit the paper strip to be advanced between it and a fixed shearing edge $P^5$ upon the front end of the plate $W^4$. When the drawer is pulled outward, the cam $M^5$ will move the vertical arm of the bell-crank to the right and force the shearing-blade $K^5$ downward to shear off the check. The cam $M^5$ is secured or formed upon the inner face of one wall of a sort of open-ended trough or guideway $Q^5$, which embraces the roller $L^5$ when the drawer is pulled forward. The upward movement of the knife-bar, under the influence of the spring $N^5$, is limited by a stop-pin $R^5$ upon the pivotal support of the bar, against which bears a pin $S^5$ upon the bar, Fig. 5.

The machine is provided with an alarm-gong $T^5$, Figs. 3, 4, and 6, which is sounded by a pair of revolving strikers $U^5$, pivoted in a plate $V^5$, fast upon a shaft $W^5$, journaled in the motor-frame C, heretofore described. The shaft $W^5$ has fast upon it a pinion $X^5$, which meshes with a large gear $Y^5$, fast upon a second shaft $Z^5$, also journaled in the frame C, and the shaft $Z^5$ has fast upon it a second pinion $A^6$, which meshes with a second large gear $B^6$, loose upon the motor-shaft B. Pivoted to the side of the gear $B^6$ is a pawl $C^6$, which is pressed by a spring $D^6$ into engagement with a ratchet $E^6$, fast upon the shaft B, Fig. 8. The result of this arrangement of parts is that when the motor turns the shaft B forward at each operation of the machine the shaft $W^5$, carrying the strikers $U^5$, will be rapidly revolved and the strikers thrown against the gong to sound the same. During the backward movement of the shaft B, as the motor is wound up by the closing of the drawer, the teeth of the ratchet $E^6$ slip backward under the pawl $C^6$ and the strikers are not revolved.

Having thus fully described my invention, I claim—

1. The combination of a motor, an oscillatory member actuated thereby, means for holding the motor in check, a series of keys controlling said means and coöperating with the oscillatory member to arrest the latter at different points, whereby upon operating any key in the series the motor will be released and the oscillatory member moved by it until arrested by the operated key, and means for restoring said member to initial position and winding up the motor.

2. The combination of a motor, an oscillatory member actuated thereby, means for holding the motor in check, a series of keys controlling said means and coöperating with the oscillatory member to arrest the latter at different points, and a money-drawer and connections for restoring the oscillatory member to initial position and winding up the motor.

3. The combination of a motor, an oscillatory member actuated thereby, means for holding the motor in check, a series of keys controlling said means and coöperating with the oscillatory member to arrest the latter at different points, a type-carrier moving with the oscillatory member, a platen coöperating therewith, and a money-drawer and connections for actuating the platen and winding up the motor.

4. The combination of a motor, an oscillatory member actuated thereby, means for holding the motor in check, a series of keys controlling said means and coöperating with the oscillatory member to arrest the latter at different points, a type-carrier moving with the oscillatory member, a platen coöperating therewith, and a money-drawer and connections for actuating the platen at the outward movement of the drawer and winding up the motor at its inward movement.

5. The combination of a motor, an oscillatory member actuated thereby, means for holding the motor in check, a series of keys controlling said means and coöperating with the oscillatory member to arrest the latter at different points, a type-carrier moving with the oscillatory member, a platen coöperating therewith, a cutter for severing the paper strip, and a money-drawer and connections for actuating the platen and cutter and winding up the motor.

6. The combination of a motor, an oscillatory member actuated thereby, means for holding the motor in check, a series of keys controlling said means and coöperating with the oscillatory member to arrest the latter at different points, a type-carrier moving with the oscillatory member, a platen coöperating therewith, a money-drawer and connections for actuating the platen and winding up the motor, and means for compelling a full outward and inward movement of the drawer.

7. The combination of a motor, an oscillatory member actuated thereby, means for holding the motor in check, a series of keys controlling said means and coöperating with the oscillatory member to arrest the latter at different points, an indicator, register and type-carrier actuated by said oscillatory member, a platen coöperating with the type-carrier, and a money-drawer and connections for actuating the platen and winding up the motor.

8. The combination of an oscillatory cylinder provided with a series of projections upon its surface, a motor for turning the cylinder in one direction, a detent for holding the motor in check, a series of keys controlling said detent and coöperating with the projections on the cylinder to arrest it at different points, a reciprocating rack in gear with the motor, and a reciprocating money-drawer and connections for restoring the rack to initial position and winding up the motor, substantially as described.

9. The combination of a motor, a series of stop-keys coöperating with the motor or a part moved by it, to arrest it at different points, a money-drawer, and a latch therefor controlled by the motor, whereby the drawer cannot be opened until the latch has been released by movement of the motor, substantially as described.

10. The combination of a motor, a detent for holding it in check, a series of stop-keys controlling said detent and coöperating with the motor or a part moved by it, to arrest it at different points, a money-drawer and a latch therefor controlled by the motor, whereby the drawer is locked until a key is operated and the motor released and permitted to move, substantially as described.

11. The combination of an oscillatory cylinder having a series of projections upon its surface, a motor for turning the cylinder in one direction, a detent for holding the motor in check, a series of keys controlling the detent and coöperating with the projections on the cylinder, a reciprocating rack in gear with the motor, a money-drawer, a latch therefor arranged to be released by the movement of the rack under the impulse of the motor, and connections between the drawer and rack for restoring the latter to initial position and winding up the motor, substantially as described.

12. The combination of a motor, an oscillatory indicator, a clutch connection between them, a detent for holding the motor in check, and a series of keys controlling such detent and clutch connection, to release the motor and connect it with the indicator by the operation of any one or another of the keys, substantially as described.

13. The combination of a motor, a detent for holding it in check, a series of stop-keys controlling the detent and coöperating with the motor or a part moved by it, to release the motor and arrest it at different points, an oscillatory indicator, and a clutch connection between the motor and indicator, controlled by the keys, substantially as described.

14. The combination of a motor, a detent for holding it in check, a series of stop-keys mounted in a fixed frame and controlling the detent and coöperating with the motor or a part moved by it, to release it and arrest it at different points, an oscillatory indicator, a clutch connection between the motor and indicator, controlled by the keys, a ratchet and pawl for temporarily holding the indicator in the position to which it may be moved by the motor, a trip for the pawl controlled by the keys, and a spring for resetting the indicator when released, substantially as described.

15. The combination, in a cash-register, of a motor, an oscillatory indicator, a clutch connection between them for causing the motor to move the indicator in one direction, a spring for resetting the indicator, and a lock for the clutch connection controlled by the indicator, for preventing engagement of the clutch until the indicator has been returned to initial position, substantially as described.

16. The combination of a motor, a detent for holding it in check, a series of stop-keys controlling said detent and coöperating with the motor or a part moved by it to arrest it at different points, an oscillatory indicator, a clutch connection between the motor and indicator, controlled by the keys, means for temporarily holding the indicator in the position to which it is moved by the motor, a trip for releasing the indicator, controlled by the keys, a spring for resetting it, and a lock for the clutch connection, controlled by the indicator, for preventing engagement of the clutch until the indicator has been returned to initial position, substantially as described.

17. The combination of a motor, an oscillatory indicator, a clutch connection between them for causing the motor to turn the indicator in one direction, means for temporarily holding the indicator in moved position, a spring for resetting it when released, and a latch engaging the indicator when returned to initial position and controlled by the clutch connection, to prevent forward movement of the indicator until the clutch members are engaged and the indicator thereby connected with the motor, substantially as described.

18. In a cash-indicator having a money-drawer, the combination of an oscillatory indicator, a motor for actuating the same, connections with the drawer for winding up the motor, and a series of keys for determining the movements of the indicator when under the influence of the motor, substantially as described.

19. In a cash-indicator having a money-drawer, the combination of an oscillatory indicator, a motor for actuating it, connections with the drawer for winding up the motor, a detent for holding the motor in check, and a series of keys controlling said detent and coöperating with the motor to determine the movement imparted by it to the indicator, substantially as described.

20. The combination of a motor-spring, a rotary shaft, a ratchet and pawl and gear connection between the motor and shaft for causing the motor to turn the shaft in one direction, an oscillatory indicator loose upon the shaft, a clutch connection between the indicator and shaft, to cause the shaft to turn the indicator with it in one direction, means for holding the indicator in the position to which it is moved by the motor, a spring, put under tension by the motor-spring for resetting it when released, a detent for holding the motor in check, and a series of keys controlling said detent and the clutch connection between the indicator and shaft and operating when pressed in or set to release the motor and then arrest it at different points, substantially as described.

21. The combination, in a cash-indicator, with the indicator, cash-drawer and operating-keys, of a movable screen for alternately hiding and exposing the indicator and connections with the keys for moving it in one direction to hide the indicator and with the cash-drawer for positively moving it in the opposite direction to expose the indicator, substantially as described.

22. The combination, in a cash-indicator, of a motor, an indicator actuated thereby, a series of keys coöperating with the motor to determine the movement of the indicator, a screen-plate for alternately hiding and exposing the indicator, connections with the keys for moving the screen-plate to hide the indicator, and a money-drawer and connections for moving the plate to expose the indicator, substantially as described.

23. The combination, in a cash-indicator, of a motor, a detent for holding it in check, a series of keys controlling said detent and coöperating with the motor to determine its movements, an indicator moved by the motor in one direction, means controlled by the keys for temporarily holding it in the position to which it is moved by the motor, a spring for resetting it when released, a screen for alternately hiding and exposing the indicator, connections with the keys for moving the screen to hide the indicator, and a cash-drawer and connections for moving the screen to expose the indicator, substantially as described.

24. The combination, in a cash-indicator, of an oscillatory indicator, a main motor-spring for turning it in one direction, a weaker spring for resetting it, which is put under tension when the indicator is moved by the main motor-spring, a series of keys for determining the movements of the indicator under the influence of the motor-spring, and means controlled by the keys for temporarily holding it in position to which it may be moved by the motor-spring, substantially as described.

25. The combination, in a cash-indicator, of an oscillatory indicator, a main motor-spring for turning it in one direction, a resetting-spring for the indicator, which is put under tension when the indicator is moved by the motor-spring, a series of keys for determining the movements of the indicator under the influence of the motor-spring, means controlled by the keys for temporarily holding the indicator in the position to which it may be moved by the motor-spring, and a money-drawer and connections for winding up the motor-spring, substantially as described.

26. In a cash-indicator having a money-drawer, the combination of an oscillatory indicator, a motor for actuating the same, connections with the money-drawer for winding up the motor, a series of keys for determining the movement of the indicator under the influence of the motor, an oscillatory screen-plate for alternately hiding and exposing the indicator, and connections with the keys for moving the screen-plate in one direction, and with the money-drawer for moving it in the opposite direction, substantially as described.

27. In a cash-indicator having a money-drawer, the combination of an oscillatory indicator, a motor for actuating the same, connections with the money-drawer for winding up the motor, a detent for holding the motor in check, a series of keys controlling said detent and coöperating with the motor to determine the movement imparted by it to the indicator, an oscillatory screen-plate for alternately hiding and exposing the indicator, and connections with the keys for moving the screen-plate in one direction and with the money-drawer for moving it in the other, substantially as described.

28. In a cash-indicator and check-printer provided with a money-drawer, the combination of an indicator and type-carrier moving in unison, a series of keys, means independent of the keys for moving the indicator and carrier distances determined by the keys, and an impression-platen actuated by the money-drawer and coöperating with the type-carrier, substantially as described.

29. In a cash-indicator and check-printer provided with a money-drawer, the combination of an indicator and type-carrier movable in unison, a series of keys, means independent of the keys for moving the indicator and carrier in one direction to an initial position and in the opposite direction to points determined by the operated keys, and an impression-platen actuated by the money-drawer and coöperating with the type-carrier, substantially as described.

30. In a cash-recorder or check-printer provided with a money-drawer, the combination of a motor, connections with the drawer for winding it up, a type-carrier actuated by the motor, a series of keys for determining the movements of the carrier under the influence of the motor, and an impression-platen actuated by the drawer and coöperating with the type-carrier, substantially as described.

31. In a cash-recorder or check-printer provided with a money-drawer, the combination of a motor, a type-carrier geared to and actuated by it, connections with the money-drawer for winding up the motor and resetting the type-carrier, a detent for holding the motor in check, a series of stop-keys controlling said detent and coöperating with the motor to arrest it and the type-carrier at different points, and an impression-platen actuated by the money-drawer and coöperating with the type-carrier, substantially as described.

32. In a check-printing machine provided with a money-drawer, the combination of a type-carrier, a series of keys, means independent of the keys for moving the type-carrier in one direction to an initial position and in the opposite direction to a point determined by the operated key, and an impression-platen and cutter actuated by the money-drawer to print and cut the check, substantially as described.

33. In a check-printing machine provided with a money-drawer, the combination of a motor, a type-carrier actuated thereby, connections with the money-drawer for winding up the motor, a detent for holding the motor in check, a series of keys controlling the detent and coöperating with the motor to determine the extent of movement imparted by it to the type-carrier, and an impression-platen and cutter actuated by the money-drawer to print and cut the checks, substantially as described.

34. In a cash-recorder or check-printer, the combination of a motor, an oscillatory cylinder geared thereto and having a series of projections upon its surface, a detent for holding the motor in check, a series of keys controlling said detent and coöperating with the projections on the cylinder, to release the motor and arrest it at different points, means for resetting the cylinder after it has been moved by the motor, a type-carrier turning with the cylinder, and an impression-platen coöperating with said carrier, substantially as described.

35. In a cash-recorder or check-printer having a money-drawer, the combination of a motor, connections with the drawer for winding it up, an oscillatory cylinder geared thereto and having a series of projections upon its surface, a detent for holding the motor in check, a series of keys controlling said detent and coöperating with the projections on the cylinder, to release the motor and arrest it at different points, a type-carrier turning with the cylinder, and an impression-platen actuated by the money-drawer and coöperating with said carrier, substantially as described.

36. In a cash register and indicator, the combination of a motor, a detent holding the same in check, a series of keys controlling said detent, a register actuated by the motor, a money-receptacle, and connections with a moving part thereof for winding up the motor, substantially as described.

37. In a cash register and indicator, the combination of a motor, a detent holding the same in check, a series of keys controlling the detent, indicating devices actuated by the motor, a money-receptacle, and connections with a moving part thereof for winding up the motor, substantially as described.

38. In a cash register and indicator, the combination of a motor, a detent holding the same in check, a series of keys controlling said detent, indicating devices actuated thereby, means controlled by the keys for temporarily holding the indicator in exposed position, a money-receptacle, and connections with a moving part thereof for winding up the motor, substantially as described.

39. In a cash register and indicator, the combination of a motor, a detent for holding the same in check, a series of keys controlling said detent, a money-receptacle, and a reciprocating rack in gear with the motor and moved in one direction by the motor and in the other by a moving member of the money-receptacle against resistance of the motor to wind up the latter, substantially as described.

40. In a registering-machine, the combination of an oscillatory cylinder having a series of projections upon its surface, means for turning the same in opposite directions at each operation, a series of keys coöperating with the projections to arrest the cylinder at different points, and a register having ratchet-and-pawl connection with the cylinder, substantially as described.

41. In a registering-machine, the combination of an oscillatory cylinder having a series of projections upon its surface, a spring for turning the cylinder in one direction, hand-operated means for turning it in the other, a detent for holding the same from movement by the spring, a series of keys controlling the detent and coöperating with the projections to arrest the cylinder at different points, and a register actuated by the cylinder, substantially as described.

42. In a recording-machine, the combination of an oscillatory cylinder having a series of projections upon its surface, a spring-motor for turning the same in one direction and hand-operated means for turning it in the other, a series of keys coöperating with the projections to arrest the cylinder at different points, a detent controlled by said keys for holding the motor in check, a type-carrier actuated by the cylinder, and a platen to coöperate with the carrier, substantially as described.

43. In a recording-machine, the combination of an oscillatory cylinder having a series of projections upon its surface, a spring for turning the cylinder in one direction and hand-operated means for turning it in the other, a series of keys coöperating with the projections to arrest the cylinder at different points, a detent controlled by said keys for holding the motor in check, a type-wheel mounted upon the axis of the cylinder and turning with it, and a platen coöperating with the type-wheel, substantially as described.

44. In a cash-indicator or analogous machine having an alarm-gong, the combination, with such gong, of a motor, a detent for holding the same in check, a series of keys controlling the detent, and a rotary striker actuated by the motor and coöperating with the gong, substantially as described.

45. In a cash-indicator or analogous machine having an alarm-gong, the combination, with such gong, of a motor, a detent for holding the same in check, a series of keys controlling the detent, a rotary shaft geared to the motor, and a pair of strike-arms pivoted in a support upon said shaft and coöperating with the gong, substantially as described.

LEO EHRLICH.

Witnesses:
W. PALMER CLARKSON,
A. MALCOL GOSSMAN.